Patented Jan. 19, 1937

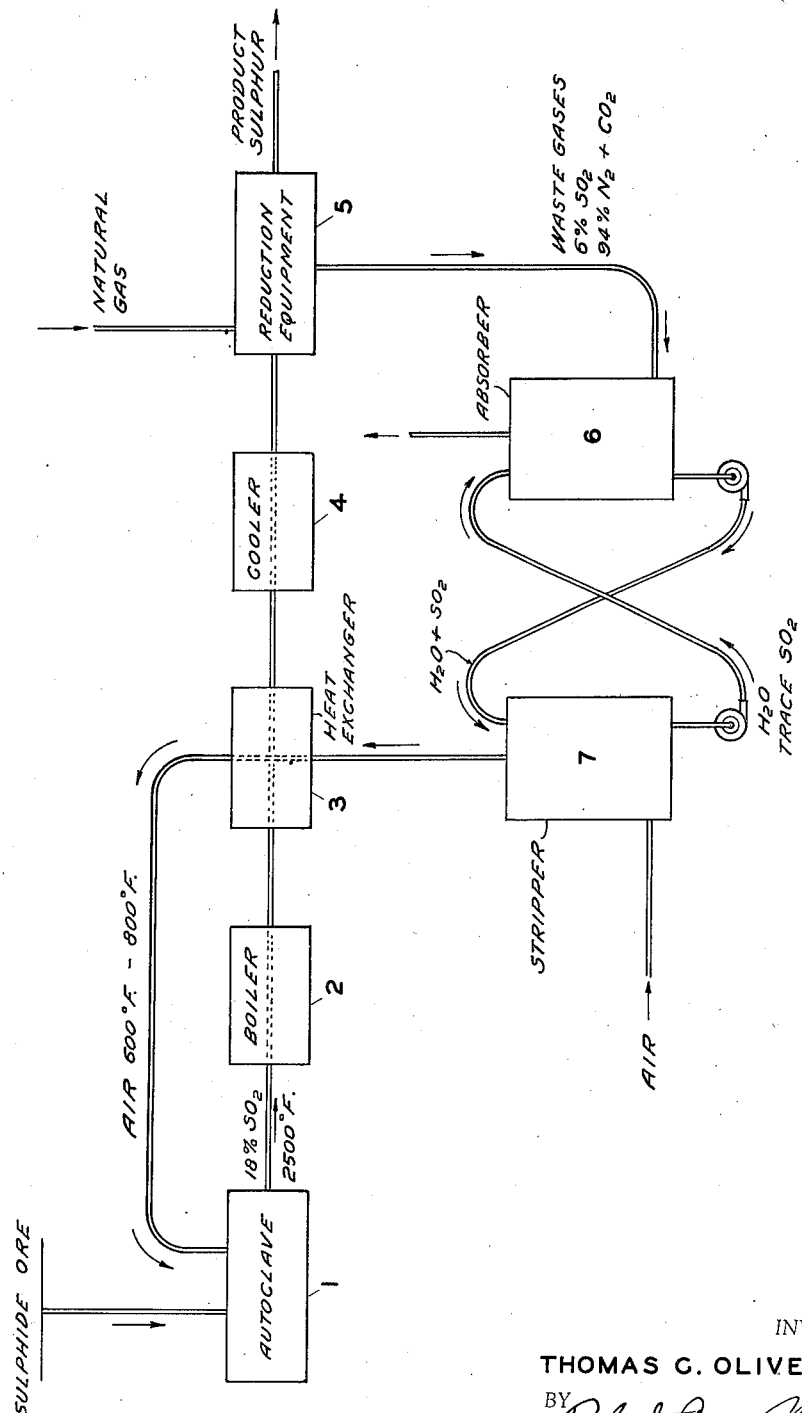

2,068,430

UNITED STATES PATENT OFFICE 2,068,430

PRODUCTION OF SULPHUR

Thomas C. Oliver, Great Neck, N. Y., assignor to Chemical Construction Corp., New York, N. Y., a corporation of Delaware Application June 9, 1934, Serial No. 729,797

11 Claims. (Cl. 23—226)

This invention relates to the production of sulphur from sulphide ores and similar sulphur-containing substances which are capable of producing $SO_2$ on combustion.

Many sulphide ores are roasted in order to recover their metallic values in a form in which they can be utilized. This results in the production of a gas containing $SO_2$ which has constituted a very serious problem in the past because large mines or smelters produce enormous quantities of $SO_2$ which frequently cannot be discharged into the atmosphere because of the disastrous effects on human beings and on vegetation in the surrounding district. The $SO_2$ has been utilized in various ways, such as, for example, in the production of sulphuric acid. However, in many cases this is not a satisfactory solution of the problem because the amount of sulphuric acid which could be prepared from the $SO_2$ gas generally far exceeds the local market for acid and as many ore deposits are located at a long distance from thickly populated centres which are usually the large acid-consuming centres, it is not feasible to transport the sulphuric acid for great distances for its value is too small to support the freight. This has seriously curtailed the operations of some smelters and mines so the usual compromise is to make as much acid as can be sold and to discharge as much $SO_2$ into the atmosphere as health legislation in the particular locality permits.

It has been proposed to avoid the disadvantages inherent to a utilization of the $SO_2$ gas from smelters for acid production. Instead of producing acid, the $SO_2$ gas is reduced to sulphur which is a commodity normally selling for approximately double the price of sulphuric acid and the weight of sulphur produced from a given quantity of $SO_2$ is only approximately one-third of that of the acid which would be produced. The higher price and smaller weight permit shipping the sulphur to much greater distances and in many cases this procedure transforms the $SO_2$ gas from a nuisance to a source of profit. This is particularly true where reducing agents, especially carbonaceous reducing agents such as natural gas, are available at low cost. In fact, in some cases where the location of sulphide ore deposits is in proximity to sources of natural gas, it is possible to produce sulphur from ores such as iron pyrites which are usually considered valueless unless located near acid consuming districts because of the comparatively low value of the iron content of the ore. Various improvements have been made in the treatment of sulphide ores in order to produce sulphur, a notable process involving the use of preheated air in limited quantities in order to generate a sufficiently high temperature in the ore burner or autoclave so as to produce molten iron oxide in the case of the treatment of iron pyrites. Ores which contain both iron and copper sulphides are normally subjected to a two-step treatment, first blowing preheated air through the charge until all of the sulphur has been burned out and then continuing the blowing of the hot air until the iron has become oxidized to molten magnetic iron oxide in which the copper is soluble, the molten copper and iron oxide being discharged. The present invention is not concerned with any particular details in the ore burning step and any modifications which may be desirable by reason of the particular characteristics of the ore or of the product desired, are included in the invention.

The reduction processes by which $SO_2$ from sulphide ores is reduced to sulphur, require a reasonably strong $SO_2$ gas. This is obtainable in various special types of furnaces where small amounts of air at high temperature are employed, it being feasible to obtain $SO_2$ gases having over 10 per cent of $SO_2$. The reduction process depends for its efficiency largely on the concentration of $SO_2$ and with too low concentrations the cost of recovering sulphur is high and there is a considerable waste. The best reduction processes also suffer from the fact that the reaction is not complete when the amounts of reducing gases are limited to the extent necessary for maintaining the concentration of sulphur in the gases at a sufficiently high figure to make the recovery economical. In a typical process using natural gas as a reducing agent, a waste gas is obtained containing up to 5 per cent of $SO_2$ practically free from oxygen and containing a balance of nitrogen and some $CO_2$ and water vapor. Such a gas is sufficiently high in $SO_2$ concentration to preclude its direct discharge into the atmosphere except in very isolated localities and in addition, the loss of $SO_2$ is quite serious.

The present invention avoids all of the disadvantages of discharging the $SO_2$ waste gases into the atmosphere, saves the $SO_2$ content and at the same time increases the capacity and efficiency of the reduction and sulphur recovery equipment. This is effected by passing the waste $SO_2$ gas from the reducing step through a suitable process which will result in separating the $SO_2$ from the nitrogen and carbon dioxide and recovering it in a form in which it may be used as part of the combustion air for the ore burning step. Any suitable purification process may be used, but I have found that the cheapest and most effective method is to absorb the $SO_2$ in a suitable liquid which may, for example, be water, or in a cyclic process, water containing a very small amount of $SO_2$ in solution or any other suitable absorbing solution, many of which are known. The absorption of the $SO_2$ is practically complete by providing a sufficient amount of absorbent and sufficient time and area of contact with the gases and the nitrogen, carbon dioxide, etc. accompanying the $SO_2$ can be vented to the atmosphere without creating any nuisance. The liquid from the absorber is then stripped of the major portion of its $SO_2$, either by the use of heat, or preferably by blowing air through it in a stripping tower, the stripped liquor which contains only very small traces of $SO_2$ being reused in the absorber after suitable cooling, if necessary. In this manner the $SO_2$ is set free either in the form of pure $SO_2$ or a mixture of $SO_2$ and air which may, for example, contain from 3 to 5 per cent of $SO_2$, and is then led to the sulphide ore burning furnace or autoclave after suitable preheating. All of the $SO_2$ is recovered and serves to increase the concentration of the $SO_2$ leaving the burner or autoclave, permitting, in the preferred modification, the obtaining from the autoclave of a gas containing 18 per cent $SO_2$, or even in some cases slightly more. This gas can be reduced to sulphur in smaller equipment than would be required for a corresponding weight of $SO_2$ in the form of a more dilute gas and the efficiency of sulphur recovery is markedly enhanced because of the much greater concentration of $SO_2$ which, in turn, results in the production of sulphur vapor of higher concentration which can be readily condensed in compact equipment. Thus the process of the present invention not only results in a recovery of the $SO_2$ usually wasted and avoids all nuisance which would be entailed in the discharge of the waste $SO_2$ into the atmosphere, but actually increases the effectiveness of the reduction and sulphur recovery equipment.

The present invention is not primarily concerned with any particular design of apparatus and it is an important advantage of the present invention that it can be used with apparatus of standard design, although actually enhancing the efficiency of reducing apparatus and sulphur recovery. The invention is also not limited to any particular process of burning sulphide ore to form $SO_2$ and reducing the gas to sulphur. An example of a typical design of ore burning autoclave is described in British Patent No. 396,690 for use with iron pyrites ore. The invention will be described in more detail in conjunction with the drawing which illustrates in purely diagrammatic form a flow sheet of the process of the present invention.

Sulphide ore is continuously fed into an autoclave ore burner 1, the feed being desirably gas tight. Hot air, having a temperature of 600 to 800° F., and containing approximately 3 per cent $SO_2$, is passed through the autoclave and results in a combustion of the sulphur in the sulphide ore to form $SO_2$. The amount of air is kept sufficiently low and its temperature is sufficiently high so that the ore melts in the case of iron pyrites, discharging an iron oxide free from sulphur. The temperature of the gases leaving the autoclave should normally be approximately 2500° F. and the $SO_2$ content is up around 18 per cent. These gases are then cooled down to a somewhat lower temperature in the boiler 2, the steam being recovered for use for generating power, heating and other purposes. The partially cooled gases are then passed through the heat exchanger 3 and through a second cooler 4, which may also be a steam boiler operating under low pressure, and/or provided with a larger heating surface. The cooled gases are then caused to react with suitable reducing gases such as, for example, natural gas in the reduction equipment 5 where a large portion of the $SO_2$ is reduced to sulphur which is then recovered by condensation and filtering.

The waste gases at a fairly low temperature contain some 5 per cent of $SO_2$, are practically free from oxygen and are diluted with nitrogen and carbon dioxide. These gases are passed up through an absorbing tower 6 in countercurrent to a stream of water containing a trace of $SO_2$, suitable packing being provided to insure an adequate contact surface between the gas and the absorbing liquid. The nitrogen and carbon dioxide, practically free from $SO_2$, are vented to the atmosphere and the liquor from the bottom of the absorbing tower is then pumped to the top of a stripping tower 7 where it flows down in countercurrent to a stream of air. The air removes the major portion of the $SO_2$, producing, for example, gas containing about 3 per cent of $SO_2$ and the water containing traces of $SO_2$ leaving the bottom of the stripper tower is pumped back to the top of the absorber. The air and $SO_2$ passes through the heat exchanger 3 where it is heated by the partially cooled gases from the boiler 2 to a temperature of 600 to 800° F. and then enters the autoclave, thereby completing the cycle.

It will be noted that concentrations up to 18 per cent of $SO_2$ are obtained in the gas leaving the autoclave under the present process. This is approximately a 20 per cent higher $SO_2$ concentration than the best that can be obtained in the same apparatus when air alone is used, which concentration can not economically be made to exceed 15 per cent $SO_2$. The additional concentration of $SO_2$ makes all of the equipment following of greater capacity because the volume is not increased, and as the equipment is all gas treating equipment, its capacity is determined by volume and not by weight of $SO_2$ passing through the system. Not only is the capacity of the various pieces of equipment increased, but the higher concentration of $SO_2$ results in a higher concentration of sulphur which reduces the losses of sulphur which otherwise may take place by reason of the presence of dilute sulphur to be condensed or filtered out. Since sulphur is the major by-product in point of value, the present invention not only increases capacity of given equipment by at least 20 per cent of the amount of sulphur produced per ton of ore, but it is notable that the advantages of the present invention are enjoyed without necessitating large capital expenditures for complicated equipment, the absorber and stripping towers and their circulating pumps being of very cheap and standard design and requiring a negligibly small amount of power for operation.

The invention has been described in conjunction with the gaseous reducing process for the $SO_2$ and this preferred modification presents many advantages. It should be understood, however, that the invention is not limited to the use of any particular reduction system, and systems using solid reducing agents such as, for example, incandescent carbon, may also be employed in the present invention which depends in no sense for its effectiveness on the particular reducing process. This flexibility of the process is an additional advantage.

The invention has been described specifically in conjunction with a process which involves stripping the $SO_2$ from the liquor with all of the air which is used in burning the sulphide ores. This is, of course, the preferred modification of the process but it should be understood that if desired additional combustion air or other oxygen containing gas may be introduced into the autoclave.

What I claim is:

1. A method of producing sulphur from sulphide ores which comprises burning the sulphide ores in a confined space with a restricted amount of oxygen containing gas to produce a concentrated $SO_2$ containing gas at high temperature, bringing the hot gas in heat exchange relation with the oxygen containing combustion gas to preheat the latter, reducing the $SO_2$ gas to sulphur under conditions producing a waste gas containing $SO_2$, separating the sulphur from the waste gas, passing the latter in contact with a liquid capable of dissolving $SO_2$, the time of contact and amount of liquid being sufficient to substantially dissolve the $SO_2$ from the waste gases, removing the absorbing liquid from contact with the waste gases, removing at least a major portion of the $SO_2$ from the absorbing liquid in the form of an $SO_2$ containing gas, passing the said gas in heat exchanging relation with the hot $SO_2$ gases from the ore burner and introducing the thus preheated gas into the ore burner, whereby the $SO_2$ content thereof is added to the $SO_2$ produced in the ore burner.

2. A method of producing sulphur from a sulphide ore which comprises, in combination, burning the sulphide ore in a restricted space with a restricted amount of preheated oxygen containing gas to produce an $SO_2$ gas of high concentration at high temperature, passing the hot $SO_2$ gas in heat exchange relation with the oxygen containing combustion gas to preheat the latter, reducing the $SO_2$ with reducing agents to produce sulphur and a waste gas containing $SO_2$, separating the sulphur from the waste gas, contacting the latter with an absorbing liquid capable of dissolving $SO_2$, sufficient time of contact and volume of absorbing liquid being provided to substantially absorb the $SO_2$, removing the absorbing liquid from contact with the waste gases, blowing air through the liquid at a sufficient temperature to remove a major portion of the absorbed $SO_2$, and to produce a gas containing $SO_2$ and oxygen, and utilizing the said gas as at least a portion of the combustion gas for the ore burner, whereby the $SO_2$ content thereof is added to the $SO_2$ produced by the burning of the ore.

3. A method according to claim 1 in which the absorbing liquid contains water as its major component and the stripped liquid from which the major portion of $SO_2$ has been removed is utilized as at least a portion of the absorbing liquid.

4. A method according to claim 2 in which the absorbing liquid contains water as its major component and the stripped liquid from which the major portion of $SO_2$ has been removed is utilized as at least a portion of the absorbing liquid.

5. A method of producing sulphur and molten iron oxide from an ore containing sulphides of iron which comprises burning the ore in a restricted space with a preheated oxygen containing gas under conditions such that a molten iron oxide is produced with evolution of a strong $SO_2$ gas at high temperature, bringing the hot $SO_2$ gas in heat exchange relation with the combustion gas to preheat the latter, reducing the $SO_2$ to sulphur with reducing agents under conditions to produce a waste gas containing $SO_2$, contacting the waste gas with sufficient absorbing liquid to substantially dissolve the $SO_2$, removing the liquid from contact with the waste gases, passing air therethrough at a temperature to produce a combustion gas containing $SO_2$ and utilizing this as at least a portion of the combustion gas for the ore burning, whereby the $SO_2$ content of the gas is added to the $SO_2$ formed by combustion of the sulphide ore.

6. A method of producing sulphur, molten iron oxide and molten copper from ores containing sulphides of iron and copper, which comprises burning the ore in a restricted space with a preheated oxygen containing gas until all of the sulphur has been burned out to form a strong $SO_2$ gas at high temperature, passing the hot $SO_2$ gas in heat exchanging relation with the combustion gas to preheat the latter, reducing the $SO_2$ with reducing agents under conditions to produce a waste gas containing $SO_2$, absorbing the $SO_2$ in an absorbing liquid, removing the absorbing liquid from contact with the waste gases, passing air through the absorbing liquid to remove the $SO_2$ and form an $SO_2$ containing combustion gas and utilizing this gas as at least part of the combustion gas for burning the ore whereby the $SO_2$ content of the gas is added to the $SO_2$ produced by combustion of the ore.

7. A method according to claim 6 in which the absorbing liquid contains water as its major component and the stripped liquid from which the major portion of $SO_2$ has been removed is utilized as at least a portion of the absorbing liquid.

8. A method according to claim 5 in which the temperature of the combustion gas is from 600 to 800° F., the burning of the sulphide ore is controlled so as to produce an $SO_2$ gas in excess of 15% $SO_2$ content at high temperature, the reduction being carried out under conditions to produce a waste gas containing approximately 6% of $SO_2$ and the stripping of the $SO_2$ from the absorbing liquid being carried out at a temperature and with an amount of air to produce a gas containing approximately 3% of $SO_2$.

9. A method according to claim 6 in which the temperature of the combustion gas is from 600 to 800° F., the burning of the sulphide ore is controlled so as to produce an $SO_2$ gas in excess of 15% $SO_2$ content at high temperature, the reduction is carried out under conditions to produce a waste gas containing approximately 6% of $SO_2$ and the stripping of the $SO_2$ from the absorbing liquid is carried out at a temperature and with an amount of air to produce a gas containing approximately 3% of $SO_2$.

10. A method according to claim 5 in which the temperature of the gases leaving the ore burner is reduced before heat exchange with the combustion gases by passing through a boiler with concomitant production of steam and the gases, after heat exchange with the combustion gases, are cooled to a temperature suitable for reduction to sulphur by means of natural gas.

11. A method according to claim 6 in which, after burning out all of the sulphur in the ore, preheated air is passed through the molten ore to oxidize the iron to molten magnetic oxide of iron.

THOMAS C. OLIVER.